US012615508B2

(12) United States Patent
Hong

(10) Patent No.: US 12,615,508 B2
(45) Date of Patent: Apr. 28, 2026

(54) METHOD FOR SENDING MDT INFORMATION, METHOD FOR RECEIVING MDT INFORMATION, ELECTRONIC DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 1087 days.

(21) Appl. No.: 17/631,296

(22) PCT Filed: Aug. 6, 2019

(86) PCT No.: PCT/CN2019/099433
§ 371 (c)(1),
(2) Date: Jan. 28, 2022

(87) PCT Pub. No.: WO2021/022474
PCT Pub. Date: Feb. 11, 2021

(65) Prior Publication Data
US 2022/0360971 A1 Nov. 10, 2022

(51) Int. Cl.
*H04W 8/20* (2009.01)
*H04W 8/18* (2009.01)
*H04W 88/06* (2009.01)

(52) U.S. Cl.
CPC ........... *H04W 8/205* (2013.01); *H04W 8/183* (2013.01); *H04W 88/06* (2013.01)

(58) Field of Classification Search
CPC ...... H04W 8/205; H04W 8/183; H04W 88/06
USPC ......................................................... 455/558
See application file for complete search history.

(56) References Cited

U.S. PATENT DOCUMENTS

| | | | | |
|---|---|---|---|---|
| 9,125,094 B2 * | 9/2015 | Wu | .............. | H04W 24/10 |
| 2012/0087259 A1 * | 4/2012 | Kim | .............. | H04W 24/10 |
| | | | | 370/252 |
| 2012/0252471 A1 | 10/2012 | Futaki | | |
| 2013/0114446 A1 | 5/2013 | Liu et al. | | |
| 2014/0146732 A1 * | 5/2014 | Olufunmilola | ....... | H04L 5/0073 |
| | | | | 370/329 |
| 2018/0035364 A1 | 2/2018 | Wang et al. | | |
| 2020/0404527 A1 | 12/2020 | Jiang | | |

FOREIGN PATENT DOCUMENTS

| | | |
|---|---|---|
| CN | 102123415 A | 7/2011 |
| CN | 103582114 A | 2/2014 |
| CN | 105900475 A | 8/2016 |
| CN | 108476379 A | 8/2018 |
| CN | 109565674 A | 4/2019 |
| WO | 2017115116 A1 | 7/2017 |

* cited by examiner

*Primary Examiner* — Chuck Huynh
(74) *Attorney, Agent, or Firm* — Volpe Koenig

(57) ABSTRACT

A method for sending MDT information, is implemented in a terminal, wherein a plurality of SIM cards are arranged in the terminal, the method includes: determining first MDT information stored in SIM cards other than a first SIM card among the plurality of SIM cards and/or a memory of the terminal, before the first SIM card establishes an RRC connection with a base station; and sending, by the terminal, the first MDT information to the base station.

16 Claims, 10 Drawing Sheets

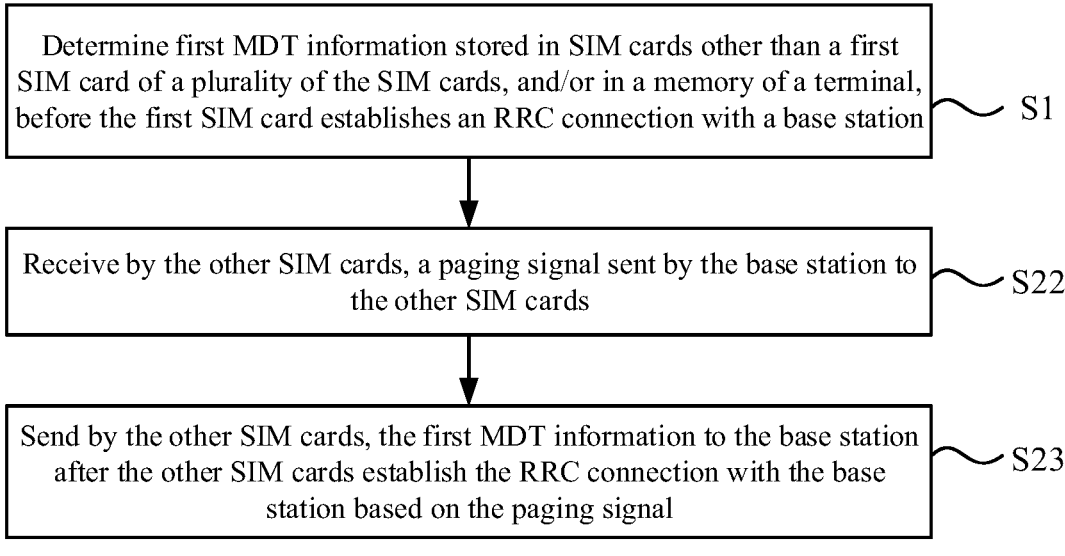

Determine first MDT information stored in SIM cards other than a first SIM card of a plurality of the SIM cards, and/or in a memory of a terminal, before the first SIM card establishes an RRC connection with a base station     ∼ S1

Receive by the other SIM cards, a paging signal sent by the base station to the other SIM cards     ∼ S22

Send by the other SIM cards, the first MDT information to the base station after the other SIM cards establish the RRC connection with the base station based on the paging signal     ∼ S23

FIG. 7

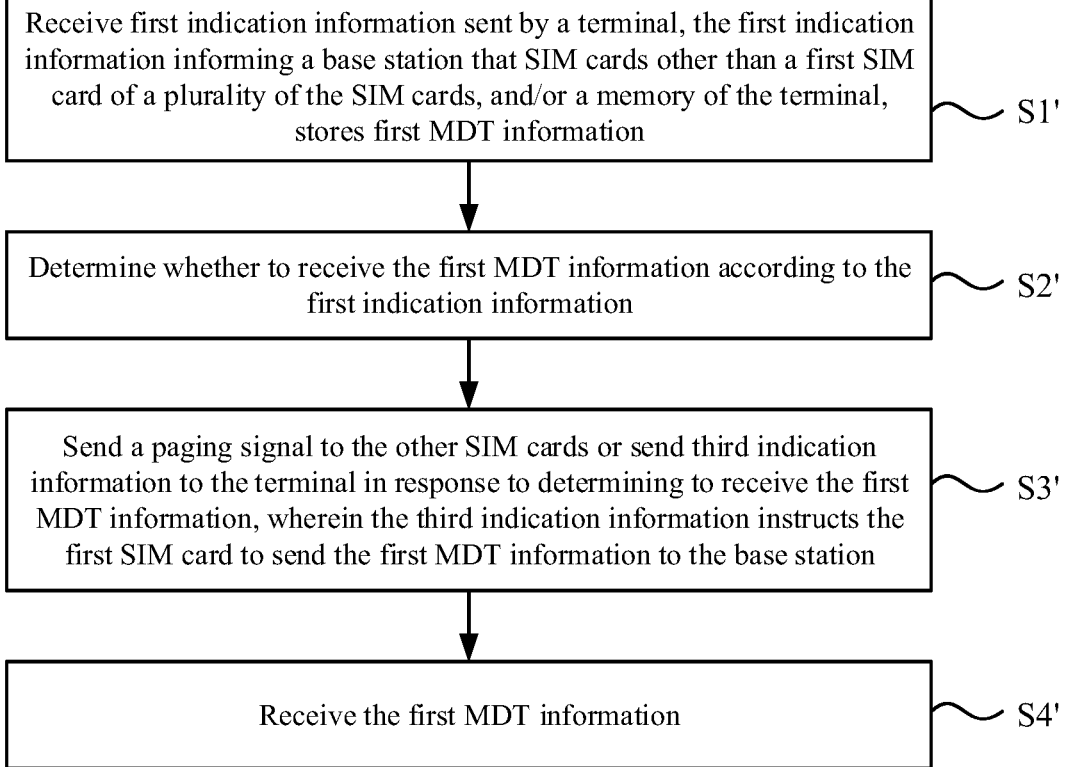

Receive first indication information sent by a terminal, the first indication information informing a base station that SIM cards other than a first SIM card of a plurality of the SIM cards, and/or a memory of the terminal, stores first MDT information     ∼ S1'

Determine whether to receive the first MDT information according to the first indication information     ∼ S2'

Send a paging signal to the other SIM cards or send third indication information to the terminal in response to determining to receive the first MDT information, wherein the third indication information instructs the first SIM card to send the first MDT information to the base station     ∼ S3'

Receive the first MDT information     ∼ S4'

FIG. 8

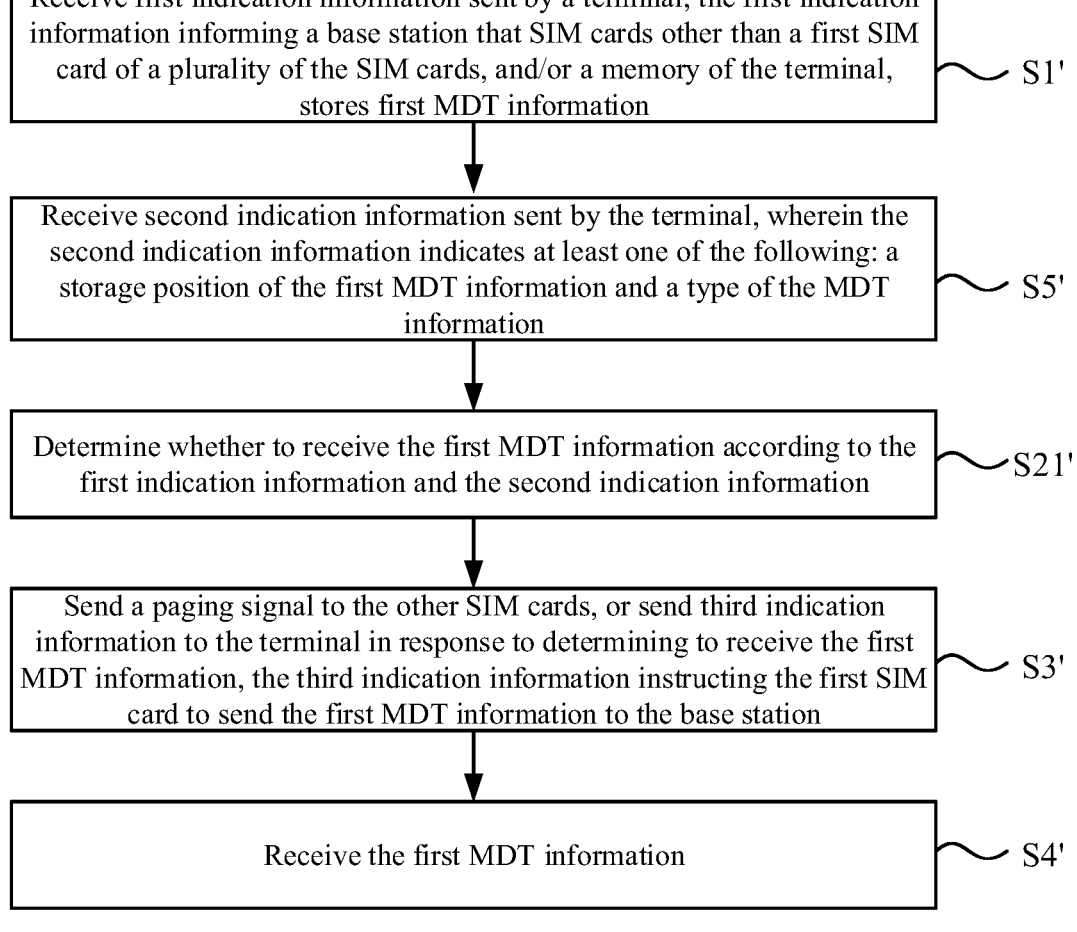

Receive first indication information sent by a terminal, the first indication information informing a base station that SIM cards other than a first SIM card of a plurality of the SIM cards, and/or a memory of the terminal, stores first MDT information          S1'

Receive second indication information sent by the terminal, wherein the second indication information indicates at least one of the following: a storage position of the first MDT information and a type of the MDT information          S5'

Determine whether to receive the first MDT information according to the first indication information and the second indication information          S21'

Send a paging signal to the other SIM cards, or send third indication information to the terminal in response to determining to receive the first MDT information, the third indication information instructing the first SIM card to send the first MDT information to the base station          S3'

Receive the first MDT information          S4'

FIG. 9

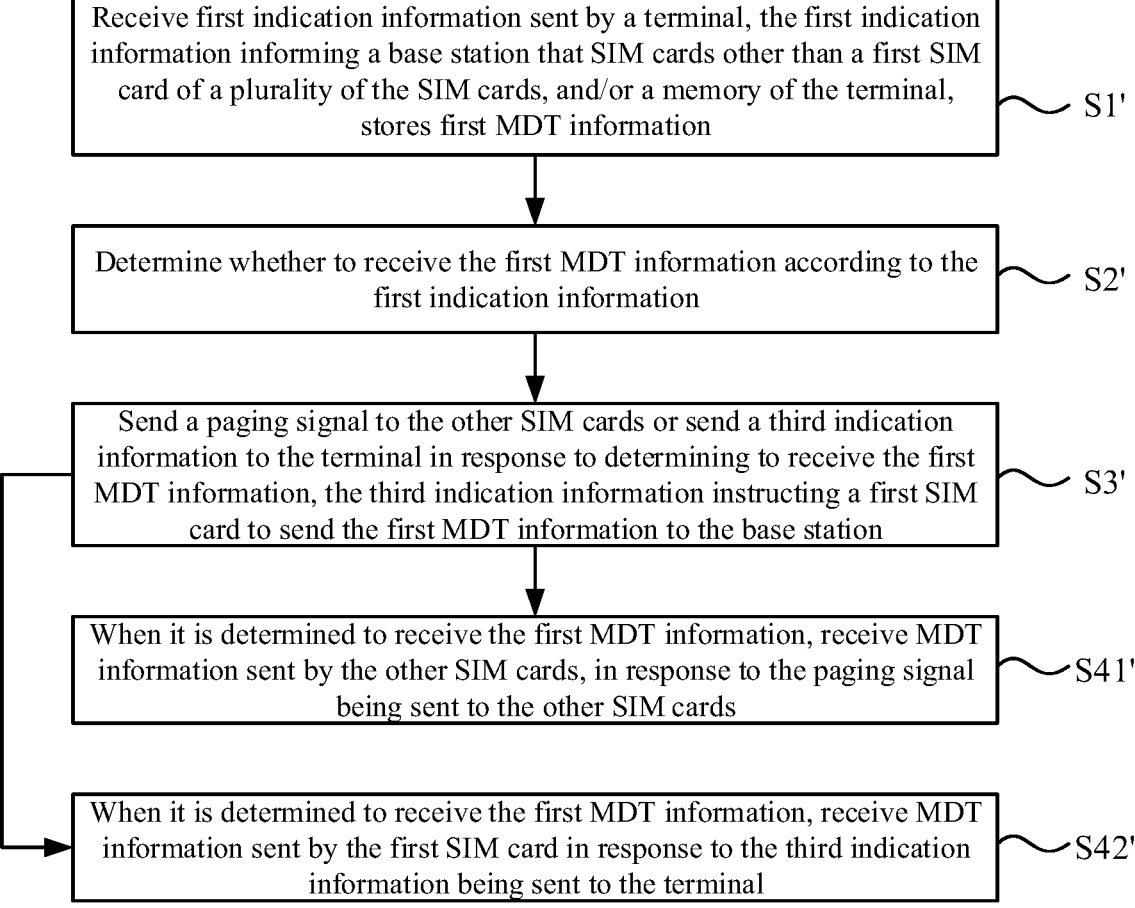

Receive first indication information sent by a terminal, the first indication information informing a base station that SIM cards other than a first SIM card of a plurality of the SIM cards, and/or a memory of the terminal, stores first MDT information ⟿ S1'

Determine whether to receive the first MDT information according to the first indication information ⟿ S2'

Send a paging signal to the other SIM cards or send a third indication information to the terminal in response to determining to receive the first MDT information, the third indication information instructing a first SIM card to send the first MDT information to the base station ⟿ S3'

When it is determined to receive the first MDT information, receive MDT information sent by the other SIM cards, in response to the paging signal being sent to the other SIM cards ⟿ S41'

When it is determined to receive the first MDT information, receive MDT information sent by the first SIM card in response to the third indication information being sent to the terminal ⟿ S42'

FIG. 10

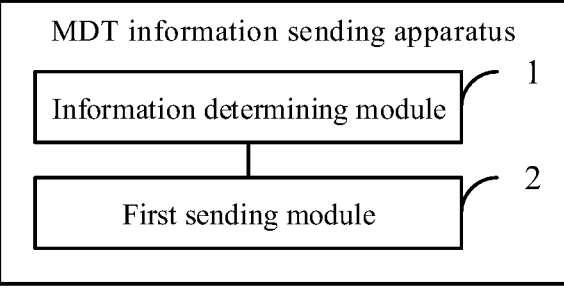

MDT information sending apparatus

Information determining module ⎞ 1

First sending module ⎞ 2

FIG. 11

METHOD FOR SENDING MDT INFORMATION, METHOD FOR RECEIVING MDT INFORMATION, ELECTRONIC DEVICE AND STORAGE MEDIUM

CROSS-REFERENCE TO RELATED APPLICATION

The present application is a U.S. National Phase Application of International Patent Application Serial No. PCT/CN2019/099433 filed on Aug. 6, 2019. The entire contents of the above-cited application are hereby incorporated by reference in their entirety for all purposes.

BACKGROUND

In order to detect the performance of a network, a Minimization of Drive Tests (MDT) technique is provided in the related art. In this technique, the network is measured by a terminal such as a mobile phone and a measurement result is sent to a base station, and thus the base station can obtain related parameters of the network.

SUMMARY

Examples of the present disclosure provide a method for sending MDT information, a method for receiving MDT information, an electronic device and a computer readable storage medium.

According to a first aspect of the present disclosure, a method for sending MDT information is implemented in a terminal in which a plurality of SIM cards are arranged, and the method includes: determining a first MDT information stored in SIM cards other than a first SIM card of the plurality of SIM cards, and/or in a memory of the terminal, before the first SIM card establishes an RRC connection with a base station; and sending, by the terminal, the first MDT information to the base station.

According to a second aspect of the present disclosure, a method for receiving MDT information is provided, including: receiving first indication information sent by a terminal, the first indication information indicating to a base station that a SIM card other than a first SIM card among a plurality of SIM cards, and/or a memory of the terminal stores first MDT information; and determining whether to receive the first MDT information according to the first indication information: sending a paging signaling to the SIM card other than the first SIM card or sending third indication information to the terminal in response to determining to receive the first MDT information, the third indication information instructing the first SIM card to send the first MDT information to the base station; and receiving the first MDT information.

According to a third aspect of the present disclosure, an electronic device is provided, including: a processor; and a memory, configured to store processor-executable instructions: the processor is configured to execute the instructions to implement the method for sending MDT information according to any of the above examples.

According to a fourth aspect of the present disclosure, an electronic device is provided, the device including: a processor; and a memory, configured to store a processor-executable instruction: the processor is configured to implement the method for receiving MDT information according to any of the above examples.

According to a fifth aspect of the present disclosure, a non-transitory computer readable storage medium is provided storing a computer program thereon. When the program is executed by a processor, steps of the method for sending MDT information according to any of the above examples are implemented.

According to a sixth aspect of the present disclosure, a non-transitory computer readable storage medium is provided storing a computer program thereon. When the program is executed by a processor, steps of the method for receiving MDT information according to any of the above examples are implemented.

BRIEF DESCRIPTION OF THE DRAWINGS

In order to describe technical solutions in examples of the present disclosure more clearly, accompanying drawings referenced in the description of the examples will be briefly introduced below. The drawings in the following brief description are only some examples of embodiments within the scope of the present disclosure, and those ordinarily skilled in the art can derive variations of these drawings and embodiments without creative work and without undue experimentation.

FIG. 7 is a flowchart of yet another method for sending MDT information, shown according to an example of the present disclosure;

FIG. 8 is a flowchart of a method for receiving MDT information, shown according to an example of the present disclosure;

FIG. 9 is a flowchart of another method for receiving MDT information, shown according to an example of the present disclosure;

FIG. 10 is a flowchart of yet another method for receiving MDT information, shown according to an example of the present disclosure;

FIG. 11 is a schematic block diagram of an apparatus for sending MDT information, shown according to an example of the present disclosure;

DETAILED DESCRIPTION

The technical solutions in the examples of the present disclosure will be described clearly and completely below with reference to the drawings in the examples of the present disclosure. The described examples are only some, but not all, of the examples within the scope of the present disclosure. All other examples derived from these examples by those ordinarily skilled in the art are intended to fall within the protection scope of the present disclosure.

In the related art, for a multi-card mobile phone with a plurality of SIM cards arranged therein, an International Mobile Equipment Identity (IMEI) is set respectively for each of the SIM cards. A base station recognizes different SIM cards as different terminals on the basis of the different IMEIs, and each of the SIM cards independently exchanges data with the base station.

In some cases, a SIM card 1 in the mobile phone performs MDT and stores MDT information, but the SIM card 1 might not be in a connected state. At the same time, a SIM card 2 might not store MDT information but might be in a connected state. Because each of the SIM cards independently performs data exchange with the base station, the base station may not be able to obtain MDT information from the terminal in time to use the MDT information.

Figures 1, 2:
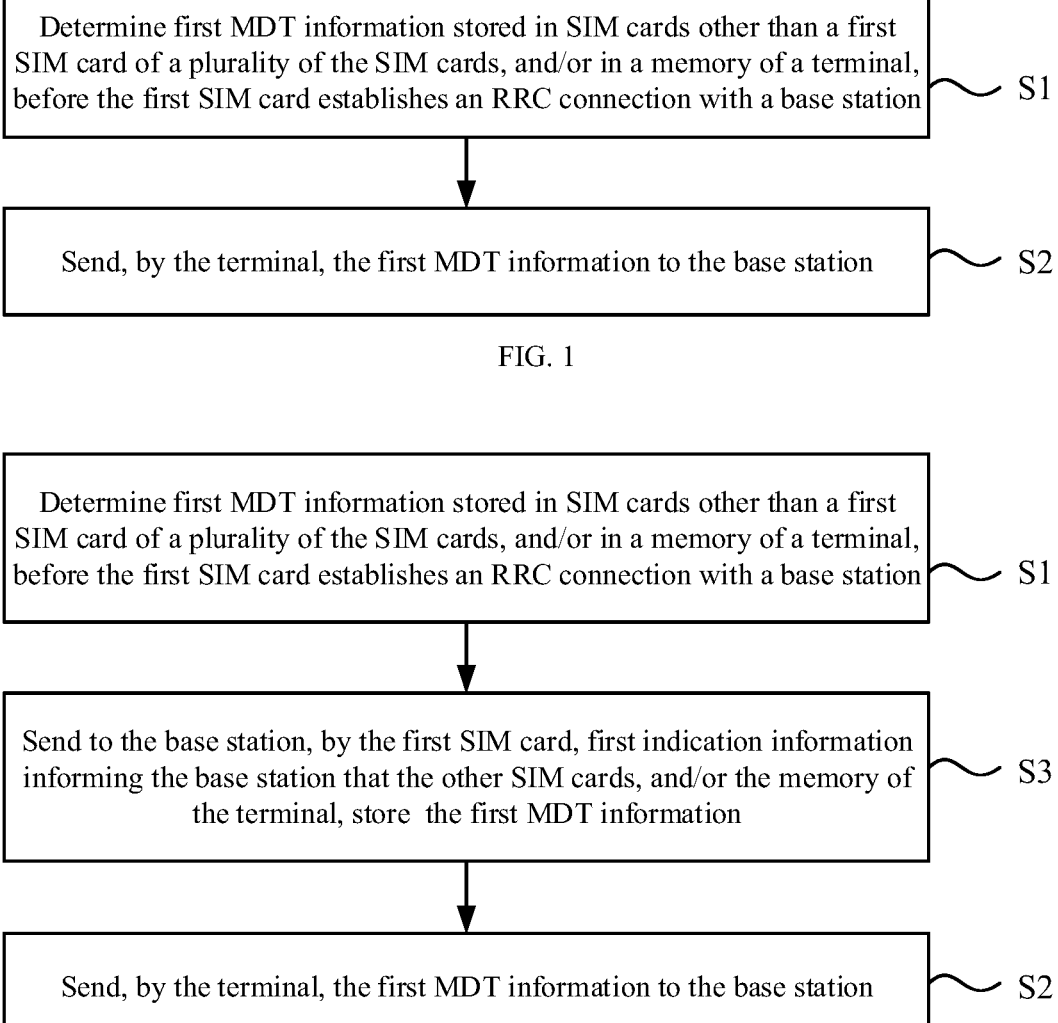
FIG. 1 is a schematic flowchart of a method for sending MDT information, shown according to an example of the present disclosure.
FIG. 2 is a schematic flowchart of another method for sending MDT information, shown according to an example of the present disclosure.

FIG. 1 is a schematic flowchart of a method for sending MDT information according to an example of the present disclosure. The method for sending MDT information according to the example of the present disclosure is implemented in a terminal. The terminal can be operable in a multi-SIM single-standby (for example, dual-SIM single-standby) mode or a multi-SIM multi-standby (for example, dual-SIM dual-standby) mode or a multi-SIM multi-standby multi-active (for example, dual-SIM dual-standby dual-active) mode for communication in a network.

The terminal may serve as user equipment (UE) to communicate with a base station. For example, the terminal may communicate with the base station in accordance with 4G Long Term Evolution (LTE) or 5G New Radio (NR) standards. A plurality of Subscriber Identity Module (SIM) cards may be arranged in the terminal, and may comprise a Universal Subscriber Identity Module (USIM), and different SIM cards may correspond to different IMEIs.

As shown in FIG. 1, the method for sending MDT information may include the following steps. In step S1, a first MDT information stored in SIM cards other than a first SIM card among a plurality of the SIM cards and/or a memory of the terminal is determined before the first SIM card establishes a Radio Resource Control (RRC) connection with the base station (for example, the first SIM card may be in an idle state or an inactive state). In step S2, the terminal sends the first MDT information to the base station. In an example, the terminal can perform MDT using different SIM cards respectively. According to the example described below; the plurality of the SIM cards comprises a first SIM card (SIM card 1) and a second SIM card 2 (SIM card 2).

Performance of an MDT by the terminal through the SIM cards may be initiated by an Operation Administration and Maintenance (OAM) function. For example, the OAM function may designate a certain SIM card in the terminal to perform the MDT in a specific Track Area (TA) or cell, or the OAM function may designate a SIM card corresponding to a specific OMEI or International Mobile Subscriber Identification Number (IMSI) to perform the MDT. MDT information obtained by performing MDT includes, but is not limited to, communication quality at a certain position.

In the example, before the first SIM card establishes the RRC connection with the base station, the first SIM card may detect whether the SIM card other than the first SIM card in the terminal stores the first MDT information. The first SIM card can detect whether each of the SIM cards other than the first SIM card stores the first MDT information. The first MDT information does not necessarily refer in particular to a certain piece of MDT information but can refer to MDT information in general, and "first" is only used for being distinguished from a subsequent "second".

The first MDT information obtained by performing MDT by any SIM card in the terminal may be stored in the terminal instead of being stored in the SIM card performing the MDT, so the first SIM card can further detect whether the terminal stores the first MDT information. In response to detecting that the SIM card other than the first SIM card and/or the memory of the terminal storing the first MDT information, the first MDT information can be sent to the base station.

For example, the first MDT information can be sent to the base station by the first SIM card after the first SIM card establishes the RRC connection (namely, entering a connected state) with the base station. If the first MDT information is stored in a second SIM card of the plurality of SIM cards, the first SIM card can obtain the first MDT information from the second SIM card, and then send the first MDT information to the base station after the first SIM card establishes the RRC connection with the base station. If the first MDT information is stored in the memory of the terminal, the first SIM card can obtain the first MDT information from the memory of the terminal, and then send the first MDT information to the base station after the first SIM card establishes the RRC connection with the base station. If the first MDT information is stored in the second SIM card and the memory of the terminal (first MDT information stored in the second SIM card and the terminal may be different MDT information), the first SIM card can obtain the first MDT information from the second SIM card and the memory of the terminal respectively, and then send the first MDT information to the base station after the first SIM card establishes the RRC connection with the base station.

For example, the first MDT information is stored in the second SIM card of the plurality of SIM cards so that a paging signaling sent by the base station can be received by the second SIM card, and in response the first MDT information is sent to the base station by the second SIM card after establishing the RRC connection with the base station.

According to the example of the present disclosure, when the first SIM card detects that the SIM card other than the first SIM card in the terminal and/or the memory of the terminal store the first MDT information, no matter whether the first SIM card stores the MDT information, the terminal can send to the base station, the first MDT information stored in the SIM card other than the first SIM card and/or the memory of the terminal, and thus the base station can obtain the MDT information in the terminal in time to use the information.

FIG. 2 is a flowchart of another method for sending MDT information according to an example of the present disclosure. As shown in FIG. 2, before the terminal sends the first MDT information to the base station, the method further includes: in step S3, first indication information is sent to the base station by the first SIM card. The first indication information indicates to the base station that the SIM card other than the first SIM card and/or the memory of the terminal stores the first MDT information.

In an example, the first indication information may also be sent to the base station by the first SIM card, and the base station is informed by the first indication information that the SIM card other than the first SIM card and/or the memory of the terminal stores the first MDT information so that the base station can determine whether to receive the first MDT information according to the first indication information.

For example, the base station can determine whether any of the SIM cards other than the first SIM card storing the first MDT information is a target SIM card based on the first indication information (for example, an IMEI of the SIM card other than the first SIM card may be compared with an IMEI of the target SIM card). If none of the SIM cards other than the first SIM card is the target SIM card, the first MDT information will not be received, and if any of the SIM cards other than the first SIM card is the target SIM card, the first MDT information will be received.

For example, the base station can determine whether the terminal storing the first MDT information is a target terminal based on the first indication information (for example, an identity of the terminal storing the first MDT information may be compared with an identity of the target terminal), if it is not the target terminal, the first MDT information will not be received, and if it is the target terminal, the first MDT information will be received.

Figures 3, 4:
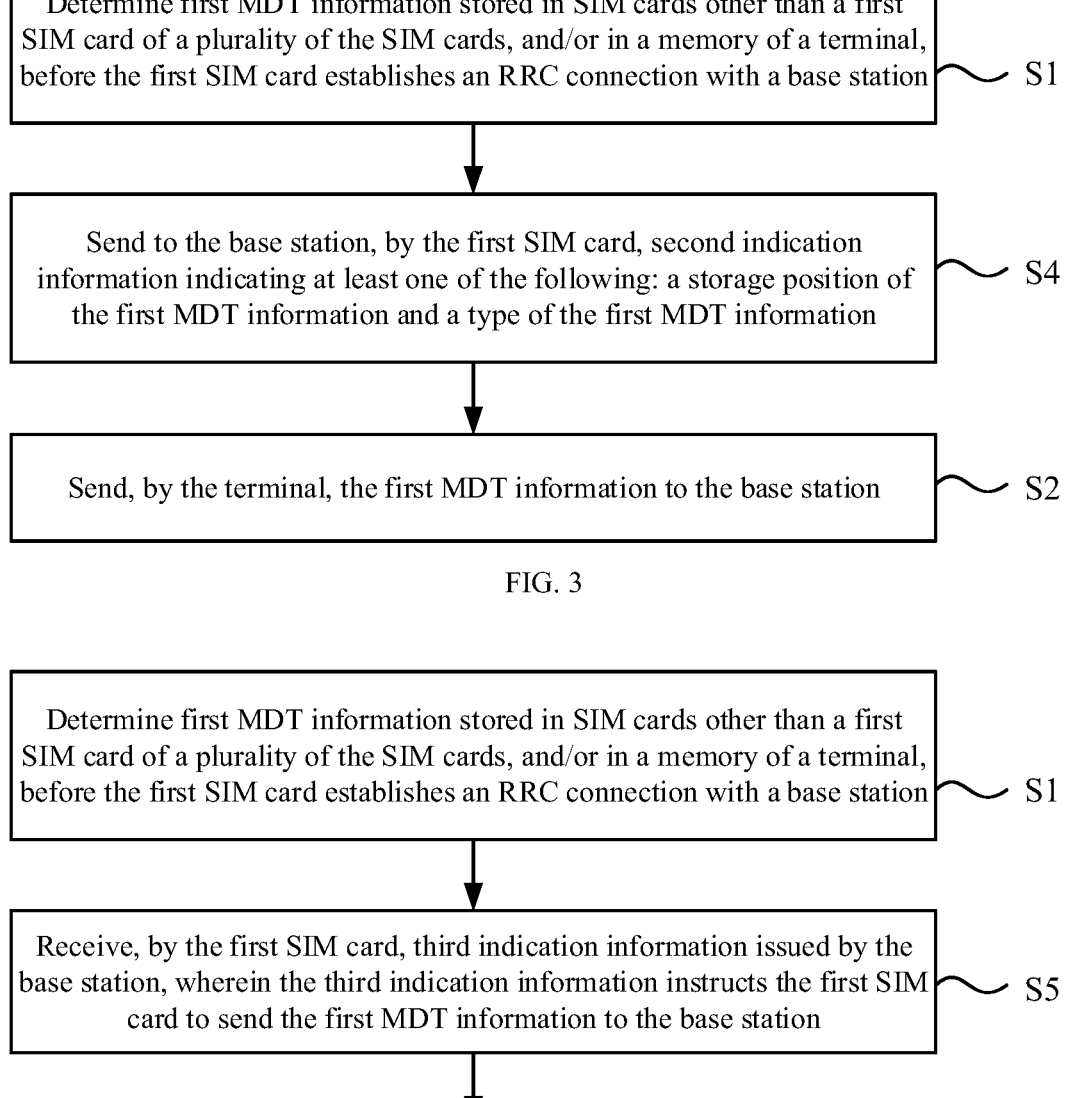
FIG. 3 is a schematic flowchart of yet another method for sending MDT information, shown according to an example of the present disclosure.
FIG. 4 is a flowchart of yet another method for sending MDT information, shown according to an example of the present disclosure.

FIG. 3 is a flowchart of yet another method for sending MDT information according to an example of the present disclosure. As shown in FIG. 3, before the terminal sends the first MDT information to the base station, the method further includes: in step S4, second indication information is sent to the base station by the first SIM card. The second indication information indicates at least one of: a storage position of the first MDT information or a type of the first MDT information.

In another example, the second indication information may also be sent to the base station by the first SIM card, and the storage position (for example, the specific position of the SIM card other than the first SIM card in which the information is stored) of the first MDT information and the type (for example, whether the first MDT information is logged MDT or immediate MDT) of the first MDT information are indicated to the base station by the second indication information, so that the base station can determine, based on the second indication information, whether to receive the first indication information.

For example, the base station can determine whether any of the SIM cards other than the first SIM card storing the second MDT information is a target SIM card, based on the second indication information (for example, an IMEI of the SIM card other than the first SIM card may be compared with an IMEI of the target SIM card), if not, the target SIM card, the first MDT information will not be received, and if so, the target SIM card, the first MDT information will be received.

For example, the base station can determine whether the type of the first MDT information is a target type according to the second indication information. If it is not the target type, the first MDT information will not be received, and if it is the target type, the first MDT information will be received.

In the example of the present disclosure, the base station can send third indication information to the terminal based on the received first indication information and/or the received second indication information. The third indication information indicates to the first SIM card to send the first MDT information to the base station, so that the first SIM card can send the first MDT information to the base station after establishing the RRC connection with the base station. The base station may also send to the SIM card other than the first SIM card, the paging signaling (fourth indication information may be carried in the paging signaling, and one or more of the SIM cards other than the first SIM card storing the first MDT information are instructed by the fourth indication information to send, after establishing the RRC connection, the first MDT information), so that the SIM card other than the first SIM card can establish the RRC connection with the base station, and send the first MDT information to the base station after establishing the RRC connection. The first indication information and the second indication information may be RRCConnectionSetupComplete signaling or RRCSetupComplete signaling.

FIG. 4 is a flowchart of yet another method for sending MDT information according to an example of the present disclosure. As shown in FIG. 4, before the terminal sends the first MDT information to the base station, the method further includes: in step S5, third indication information issued by the base station is received by the first SIM card. The third indication information is configured to indicate the first SIM card to send the first MDT information to the base station.

In an example, in response to the base station determining to receive the first indication information, the base station can send the third indication information to the terminal. The third indication information indicates the first SIM card is to send the first MDT information to the base station. After the first SIM card receives the third indication information, the first SIM card can determine that the base station seeks to receive the first indication information, and thus it can send the first MDT information to the base station after establishing the RRC connection with the base station.

Figures 5, 6:
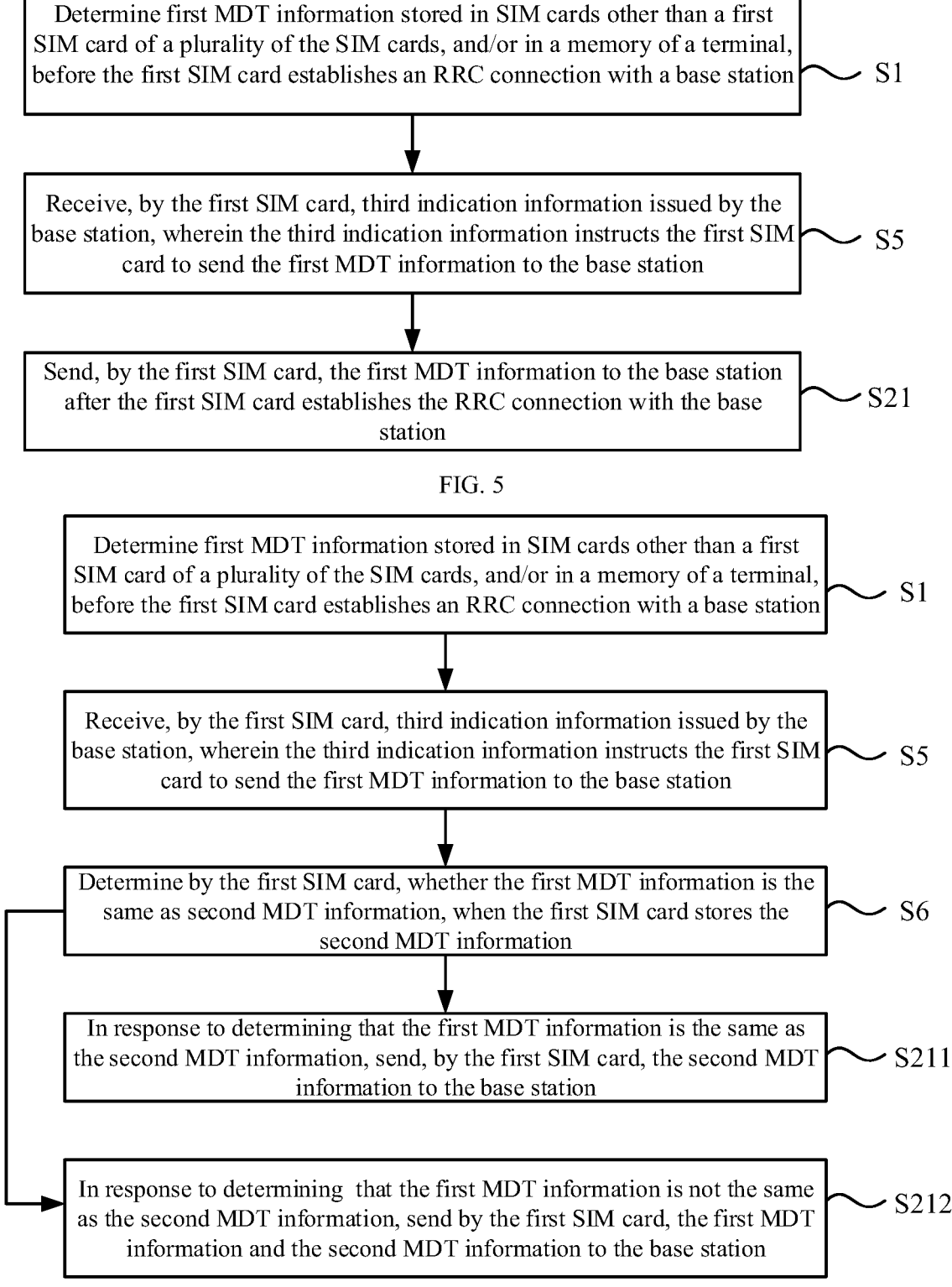
FIG. 5 is a flowchart of yet another method for sending MDT information, shown according to an example of the present disclosure.
FIG. 6 is a flowchart of yet another method for sending MDT information, shown according to an example of the present disclosure.

FIG. 5 is a flowchart of yet another method for sending MDT information according to an example of the present disclosure. As shown in FIG. 5, sending, by the terminal, the first MDT information to the base station includes: in step S21, the first MDT information is sent to the base station by the first SIM card after the first SIM card establishes the RRC connection with the base station. In an example, the first MDT information may be sent by the first SIM card. For example, the first MDT information is stored in a second SIM card among the plurality of SIM cards. The first SIM card may obtain the first MDT information from the second SIM card, and then send the first MDT information to the base station after the first SIM card establishes the RRC connection with the base station. If the first MDT information is stored in the memory of the terminal, the first SIM card can obtain the first MDT information from the memory of the terminal, and then send the first MDT information to the base station after the first SIM card establishes the RRC connection with the base station.

If the first MDT information is stored in both the second SIM card and the memory of the terminal, the first MDT information may include a first sub-information stored in the second SIM card and a second sub-information stored in the memory of the terminal. In that case the first SIM card can compare whether the first sub-information is the same as the second sub-information. If the first sub-information is the same as the second sub-information, the first SIM card can obtain the first sub-information from the second SIM card, or obtain the second sub-information from the terminal, and then send the obtained information to the base station. If the first sub-information is not the same as the second sub-information, the first SIM card can obtain the first sub-information from the second SIM card and obtain the second sub-information from the terminal, and then send the obtained first sub-information and the obtained second sub-information to the base station.

FIG. 6 is a flowchart of yet another MDT information method according to an example of the present disclosure. As shown in FIG. 6, before sending the first MDT information to the base station by the first SIM card, the method further includes: in step S6, in response to the first SIM card storing a second MDT information, whether the first MDT information is the same as the second MDT information is determined by the first SIM card: wherein sending the first MDT information to the base station by the first SIM card includes: in step S211, in response to the first MDT information being determined to be the same as the second MDT information, the second MDT information is sent to the base station by the first SIM card; and in step S212, in response to the first MDT information being determined not to be the same as the second MDT information, the first MDT information and the second MDT information are sent to the base station by the first SIM card.

In an example, the SIM card other than the first SIM card and/or the memory of the terminal can store the first MDT information. Also, the first SIM card itself can store the second MDT information. In this case the first SIM card can determine whether the first MDT information is the same as the second MDT information. For example, the first SIM card can determine whether a measurement time of the first MDT information is the same as that of the second MDT information and whether a measurement object of the first MDT information is the same as that of the second MDT information, etc.

If the first MDT information is the same as the second MDT information, the second MDT information can be sent to the base station by the first SIM card without sending the first MDT information to the base station. In this way, on the one hand, a data volume of information sent to the base station is reduced, and on the other hand, an action of obtaining the first MDT information from the SIM card other than the first SIM card or the memory of the terminal can be omitted.

If the first MDT information is not the same as the second MDT information, the first MDT information and the second MDT information can be sent to the base station by the first SIM card so that it is guaranteed that the base station can obtain comprehensive MDT information in time to use it.

FIG. 7 is a flowchart of yet another method for sending MDT information shown according to an example of the present disclosure. As shown in FIG. 7, sending the first MDT information to the base station includes: in step S22, a paging signaling sent by the base station to the SIM card other than the first SIM card is received by the SIM card other than the first SIM card. In step S23, the first MDT information is sent to the base station by the SIM card other than the first SIM card after the SIM card other than the first SIM card establishes the RRC connection with the base station based on the paging signaling.

In an example, the base station can send to the SIM card other than the first SIM card, the paging signaling (fourth indication information may be carried in the paging signaling, and a SIM card storing the first MDT information is instructed by the fourth indication information to send, after establishing the RRC connection, the first MDT information, wherein the SIM card other than the first SIM card can establish the RRC connection with the base station after receiving the paging signaling, and can send the first MDT information to the base station after establishing the RRC connection.

FIG. 8 is a flowchart of a method for receiving MDT information according to an example of the present disclosure. The method for receiving MDT information according to the example of the present disclosure is implemented in a base station. The base station may communicate with a terminal serving as user equipment, for example, the base station may communicate with the terminal based on 4G LTE or 5G NR standards.

The terminal may communicate based on a multi-SIM single-standby (for example, dual-SIM single-standby) mode or a multi-card multi-standby (for example, dual-SIM dual-standby) mode or a multi-SIM multi-standby multi-active (for example, dual-SIM dual-standby dual-active) mode. A plurality of SIM cards may be arranged in the terminal. These may comprise a USIM, and different SIM cards may correspond to different IMEIs.

As shown in FIG. 8, the method for receiving MDT information may include the following steps. In step S1', a first indication information sent by a terminal is received. The first indication information is configured to indicate the base station that SIM cards other than a first SIM card of a plurality of the SIM cards, and/or a memory of the terminal, stores a first MDT information. In Step S2', it is determined whether to receive the first MDT information according to the first indication information. In step S3', in response to determining to receive the first MDT information, a paging signaling is sent to the SIM card other than the first SIM card or a third indication information is sent to the terminal. The third indication information is configured to indicate the first SIM card to send the first MDT information to the base station. In step S4', the first MDT information is received.

In an example, the terminal can send the first indication information to the base station, and the base station is informed by the first indication information that the SIM card other than the first SIM card, and/or the memory of the terminal, stores the first MDT information so that the base station can determine whether to receive the first MDT information according to the first indication information.

For example, the base station can determine whether one of the SIM cards other than the first SIM card storing the first MDT information is a target SIM card according to the first indication information (for example, an IMEI of one of the SIM cards other than the first SIM card may be compared with an IMEI of the target SIM card), if it is not the target SIM card, the first MDT information will not be received, and if it is the target SIM card, the first MDT information will be received.

For example, the base station can determine whether the terminal storing the first MDT information is a target terminal according to the first indication information (for example, an identity of the terminal of the first MDT information may be compared with an identity of the target terminal), if it is not the target terminal, the first MDT information will not be received, and if it is the target terminal, the first MDT information will be received.

The base station can send a paging signaling to the SIM card other than the first SIM card or can send third indication information to the terminal if the base station determines to receive the first MDT information. The third indication information instructs the first SIM card to send the first MDT information to the base station, and then the first MDT information is received.

According to the example of the present disclosure, no matter whether the first SIM card stores the MDT information, when the first SIM card detects that the SIM card other than the first SIM card in the terminal and/or the memory of the terminal stores the first MDT information, the first MDT information stored in the SIM card other than the first SIM card and/or the memory of the terminal can be sent to the base station, and thus the base station can obtain the MDT information in the terminal in time to use the MDT information.

FIG. 9 is a flowchart of another method for receiving MDT information according to an example of the present disclosure. As shown in FIG. 9, before determining whether to receive the first MDT information according to the first indication information, the method further includes: in step S5', a second indication information sent by the terminal is received. The second indication information indicates at least one of: a storage position of the first MDT information or a type of the first MDT information; wherein determining whether to receive the first MDT information according to the first indication information includes: in step S21', it is determined whether to receive the first MDT information according to the first indication information and the second indication information.

In an example, the terminal may further send the second indication information to the base station, the storage position of the first MDT information and the type of the first MDT information being indicated to the base station by the second indication information so that the base station can determine whether to receive the first MDT information according to the first indication information and the second indication information.

For example, the base station can determine whether one of the SIM cards other than the first SIM card storing the second MDT information is a target SIM card according to the second indication information (for example, an IMEI of the SIM card other than the first SIM card may be compared with an IMEI of the target SIM card), if it is not the target SIM card, the first MDT information will not be received, and if it is the target SIM card, the first MDT information will be received.

For example, the base station can determine whether a type of the first MDT information is a target type according to the second indication information, if it is not the target type, the first MDT information will not be received, and if it is the target type, the first MDT information will be received.

FIG. 10 is a flowchart of yet another method for receiving MDT information according to an example of the present disclosure. As shown in FIG. 10, when it is determined to receive the first MDT information, in response to sending the paging signaling to the SIM card other than the first SIM card, receiving the first MDT information includes: in step S41', the MDT information sent by the SIM card other than the first SIM card is received. If it is determined to receive the first MDT information, in response to sending the third indication information to the terminal, receiving the first MDT information includes: in step S42', the MDT information sent by the first SIM card is received.

In an example, the base station can send the paging signaling to the SIM card other than the first SIM card (fourth indication information may be carried in the paging signaling, and the SIM card storing the first MDT information is instructed by the fourth indication information to send, after establishing the RRC connection, the first MDT information). The terminal can establish the RRC connection with the base station by the SIM card other than the first SIM card after receiving the paging signaling, and can send the first MDT information to the base station via the SIM card other than the first SIM card after establishing the RRC connection.

In an example, the first MDT information can be sent by the first SIM card. For example, the first MDT information is stored in a second SIM card among the plurality of SIM cards. The first SIM card can obtain the first MDT information from the second SIM card, and then can send the first MDT information to the base station after the first SIM card establishes the RRC connection with the base station. If the first MDT information is stored in the memory of the terminal, the first SIM card can obtain the first MDT information from the memory of the terminal, and then can send the first MDT information to the base station after the first SIM card establishes the RRC connection with the base station. If the first MDT information is stored in the second SIM card and the memory of the terminal (first MDT information stored in the second SIM card and the terminal may be different MDT information), the first SIM card can obtain the first MDT information from the second SIM card and the memory of the terminal respectively, and then can send the first MDT information to the base station after the first SIM card establishes the RRC connection with the base station.

Corresponding to the examples of the above method for sending MDT information and the above method for receiving MDT information, the present disclosure further provides examples of an apparatus for sending MDT information and an apparatus for receiving MDT information.

FIG. 11 is a schematic block diagram of an apparatus for sending MDT information shown according to an example of the present disclosure. The apparatus for sending MDT information in this example of the present disclosure, is implemented in a terminal. The terminal may communicate based on a multi-SIM single-standby (for example, dual-SIM single-standby) mode or a multi-SIM multi-standby (for example, dual-SIM dual-standby) mode or a multi-SIM multi-standby multi-active (for example, dual-SIM dual-standby dual-active) mode.

The terminal may serve as a user equipment to communicate with a base station. For example, the terminal may communicate with the base station based on 4G LTE or 5G NR technology: A plurality of SIM cards may be arranged in the terminal, any one or more of these may comprise a USIM, and different SIM cards can correspond to different IMEIs.

As shown in FIG. 11, the apparatus for sending MDT information may include: an information determining module 1 configured to determine first MDT information stored in SIM cards other than a first SIM card among the plurality of the SIM cards and/or a memory of the terminal before the first SIM card among the plurality of SIM cards establishes an RRC connection with the base station, and the information determining module may be arranged in the first SIM card or in the terminal; and a first sending module 2, configured to send the first MDT information to the base station.

Figure 12:
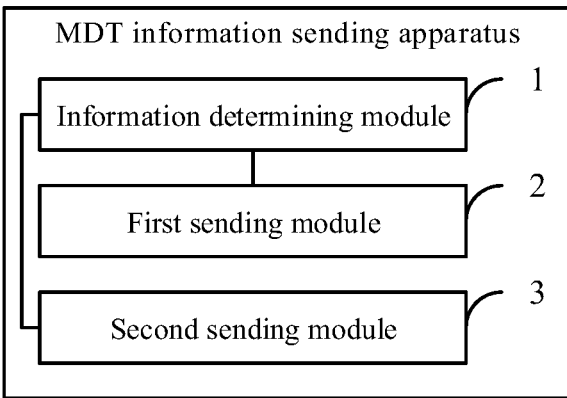
FIG. 12 is a schematic block diagram of another apparatus for sending MDT information, shown according to an example of the present disclosure.

FIG. 12 is a schematic block diagram of another apparatus for sending MDT information shown according to an example of the present disclosure. As shown in FIG. 12, the apparatus further includes: a second sending module 3, wherein the first SIM card is configured to send first indication information to the base station by the second sending module. The first indication information informs the base station that the SIM card other than the first SIM card and/or the memory of the terminal stores the first MDT information.

Figure 13:
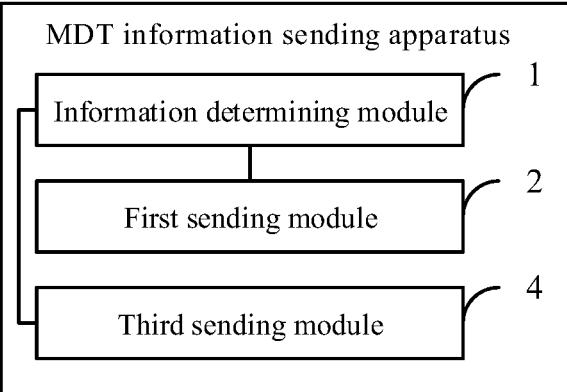
FIG. 13 is a schematic block diagram of yet another apparatus for sending MDT information, shown according to an example of the present disclosure.

FIG. 13 is a schematic block diagram of yet another apparatus for sending MDT information shown according to an example of the present disclosure. As shown in FIG. 13, the apparatus further includes: a third sending module 4, wherein the first SIM card is configured to send second indication information to the base station by the third sending module. The second indication information indicates at least one of: a storage position of the first MDT information or a type of the first MDT information.

Figure 14:
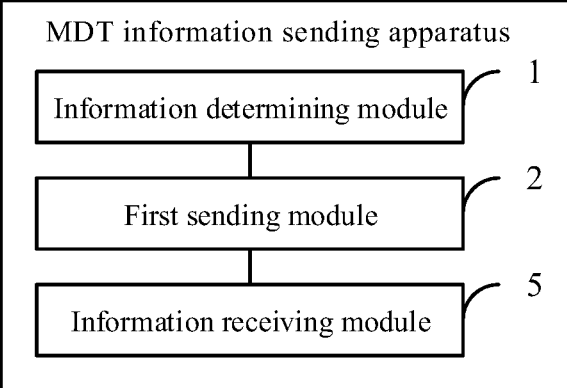
FIG. 14 is a schematic block diagram of yet another apparatus for sending MDT information, shown according to an example of the present disclosure.

FIG. 14 is a schematic block diagram of yet another apparatus for sending MDT information shown according to an example of the present disclosure. As shown in FIG. 14, the apparatus further includes: an information receiving module 5, where the first SIM card is configured to receive, by the information receiving module, a third indication information issued by the base station. The third indication information is configured to indicate the first SIM card to send the first MDT information to the base station. In one example, the first SIM card is configured to send the first MDT information to the base station by the first sending module after establishing the RRC connection with the base station.

Figure 15:
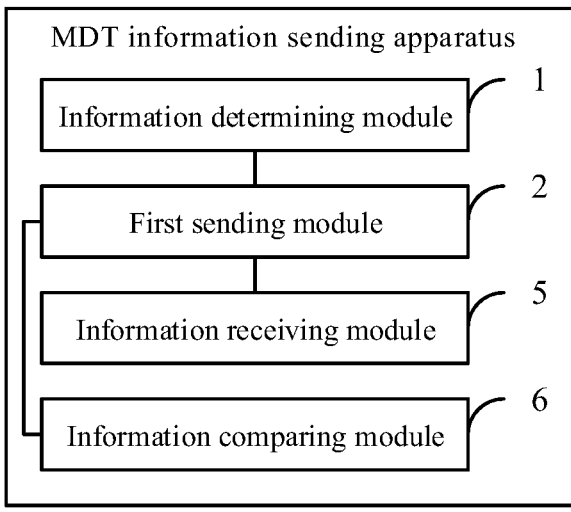
FIG. 15 is a schematic block diagram of yet another apparatus for sending MDT information, shown according to an example of the present disclosure.

FIG. 15 is a schematic block diagram of yet another apparatus for sending MDT information shown according to an example of the present disclosure. As shown in FIG. 15, the apparatus further includes: an information comparing module 6, configured to determine whether a first MDT information is the same as a second MDT information in response to the first SIM card storing the second MDT information; wherein the first SIM card is configured to send the second MDT information to the base station by the first sending module in response to the first MDT information being determined to be the same as the second MDT information, and to send the first MDT information and the second MDT information to the base station by the first sending module in response to the first MDT information being determined not to be the same as the second MDT information.

The information comparing module may be a module disposed in the terminal, and a processor comprising the terminal can execute processor-executable instructions to perform an operation of comparing whether the first MDT information is the same as the second MDT information. The information comparing module may also be a module in the first SIM card, and a processor of the first SIM card can execute processor executable instructions that cause the processor to perform the operation of comparing whether the first MDT information is the same as the second MDT information.

Figure 16:
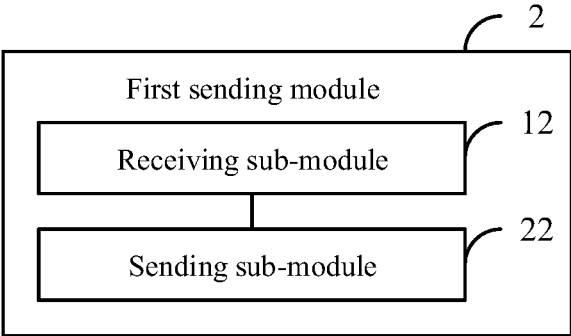
FIG. 16 is a schematic block diagram of a first sending module shown according to an example of the present disclosure.

FIG. 16 is a schematic block diagram of a first sending module shown according to an example of the present disclosure. As shown in FIG. 16, the first sending module 2 includes: a receiving sub-module 21, wherein the SIM card other than the first SIM card is configured to receive, by the receiving sub-module, a paging signaling sent by the base station to the SIM card other than the first SIM card; and a sending sub-module 22, wherein the SIM card other than the first SIM card is configured to send the first MDT information to the base station by the sending sub-module after establishing the RRC connection with the base station based on the paging signaling.

The first sending module, the second sending module, the third sending module and the information receiving module in the above examples may be antennas or modules related to antennas of the terminal, and the first sending module, the second sending module and the third sending module may comprise the same module (for example, the three sending modules correspond to the same antenna, and the antenna sends information corresponding to the different sending modules in different periods of time), or the modules may be different modules (for example, three antennas are arranged in the terminal, and each of the antennas serves as a respective, corresponding one of the different sending modules).

Figure 17:
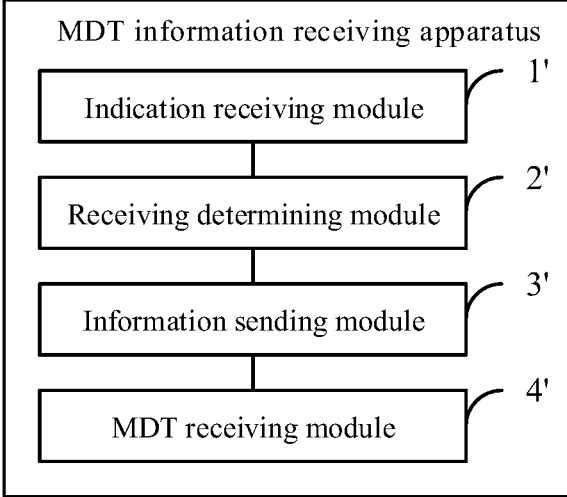
FIG. 17 is a schematic block diagram of an apparatus for receiving MDT information, shown according to an example of the present disclosure.

FIG. 17 is a schematic block diagram of an apparatus for receiving MDT information shown according to an example of the present disclosure. The apparatus for receiving MDT information shown by the example of the present disclosure is implemented in a base station. The base station can communicate with a terminal serving as a user equipment, for example, the base station may communicate with the terminal based on 4G LTE or 5G NR technology.

The terminal can communicate based on a multi-SIM single-standby (for example, dual-SIM single-standby) mode or a multi-SIM multi-standby (for example, dual-SIM dual-standby) mode or a multi-SIM multi-standby multi-active (for example, dual-SIM dual-standby dual-active) mode. A plurality of SIM cards may be arranged in the terminal, any one or more of which may comprise a USIM, and different SIM cards may correspond to different IMEIs.

As shown in FIG. 17, the apparatus for receiving MDT information includes: an indication receiving module 1' configured to receive first indication information sent by the terminal, the first indication information informs the base station that the SIM cards other than a first SIM card of a plurality of the SIM cards, and/or a memory of the terminal stores first MDT information; a receiving determining module 2' configured to determine whether to receive the first MDT information based on the first indication information; an information sending module 3' configured to send a paging signaling to the SIM card other than the first SIM card or, send third indication information to the terminal in response to determining to receive the first MDT information, wherein the third indication information instructs the first SIM card to send the first MDT information to the base station; and an MDT receiving module 4', configured to receive the first MDT information. In one example, the indication receiving module is further configured to receive second indication information sent by the terminal. The second indication information indicates at least one of: a storage position of the first MDT information or a type of the first MDT information; where the receiving determining module is configured to determine whether to receive the first MDT information based on the first indication information and the second indication information.

In one example, in response to determining to receive the first MDT information, the MDT receiving module is configured to receive MDT information sent by the SIM card other than the first SIM card in response to the paging signaling being sent to the SIM card other than the first SIM card. Alternatively, in response to determining to receive the first MDT information, the MDT receiving module is configured to receive MDT information sent by the first SIM card in response to the third indication information being sent to the terminal.

Specific modes of executing operations by all modules of the apparatuses in the above examples are discussed in detail in the examples of the related methods as described above and need not be set forth in detail here.

The apparatus examples generally correspond to the method examples, so functions performed by relevant parts of the described apparatus, e.g., a processor of the apparatus, can correspond to actions or steps described with respect to a corresponding method example. The examples of the apparatus described above are but a few of many possible examples. Modules described as separated components may or may not be physically separate. Components shown as modules may be physically located in one place, or may be distributed amongst a plurality of network nodes or components as separately located modules. Part or all of the modules can be selected or invoked by a processor according to actual demands to realize the objectives of the solutions of the examples. Those ordinarily skilled in the art, upon reading this disclosure and appreciating the teachings herein, will understand and be able to implement these and variations of these without creative work and without undue experimentation.

An example within the scope of the present disclosure further provides an electronic device, including: a processor; and a memory, configured to store a processor-executable instruction; the processor is configured to implement the method for sending MDT information according to any of the above examples.

An example of the present disclosure further provides an electronic device, including: a processor; and a memory, configured to store processor-executable instructions that configure the processor to implement the method for receiving MDT information according to any of the above examples.

An example within the scope of the present disclosure further provides a computer-readable storage medium storing a computer program thereon. When the program is executed by a processor, the steps of the method for sending MDT information according to any of the above examples are implemented.

An example of the present disclosure further provides a computer-readable storage medium storing a computer program thereon. When the program is executed by a processor, steps of the method for receiving MDT information according to any of the above examples are implemented.

Figure 18:
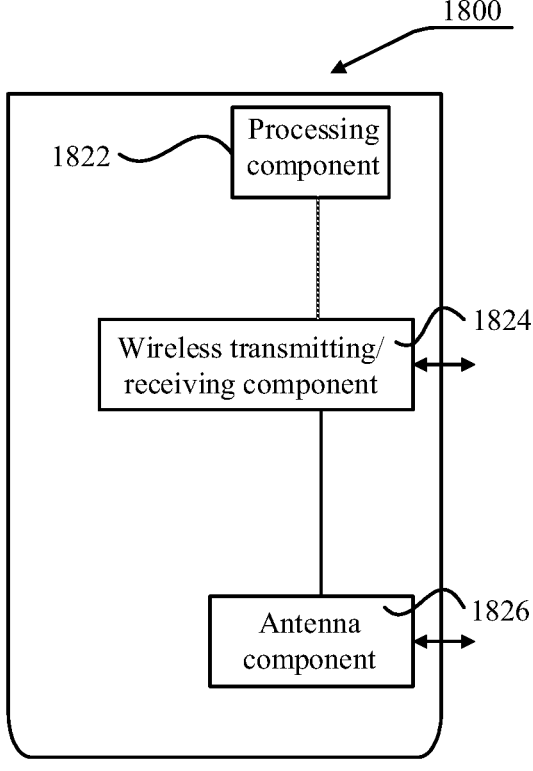
FIG. 18 is a schematic block diagram of an apparatus 1800 for receiving MDT information, shown according to an example of the present disclosure.

As shown in FIG. 18, which is a schematic block diagram of an apparatus 1800 for receiving MDT information shown according to an example of the present disclosure, the apparatus 1800 may be implemented in a base station. Referring to FIG. 18, the apparatus 1800 includes a processing component 1822, a wireless transmitting/receiving component 1824, an antenna component 1826, and a signal processing portion special for a wireless interface. The processing component 1822 may further include one or more processors. One processor in the processing component 1822 may be configured to implement the method for receiving MDT information according to any of the above examples.

Figure 19:
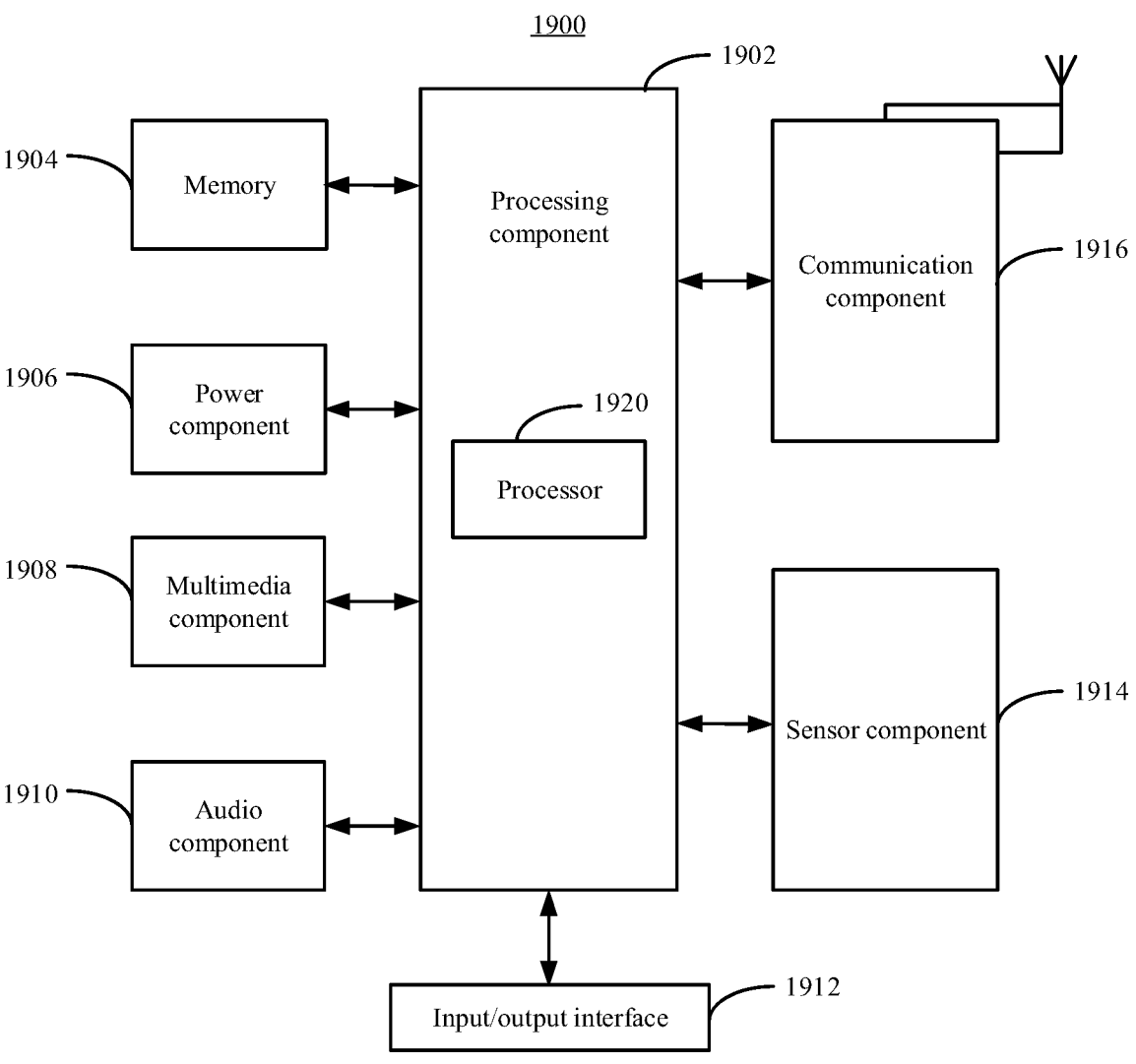
FIG. 19 is a schematic block diagram of an apparatus 1900 for sending MDT information, shown according to an example of the present disclosure.

FIG. 19 is a schematic block diagram of an apparatus 1900 for sending MDT information, shown according to an example of the present disclosure. For example, the apparatus 1900 may be a mobile phone, a computer, a digital broadcast terminal, a messaging device, a game console, a tablet device, a medical device, a fitness facility, a personal digital assistant, etc.

Referring to FIG. 19, the apparatus 1900 may include one or more components as follows: a processing component 1902, a memory 1904, a power component 1906, a multimedia component 1908, an audio component 1910, an input/output (I/O) interface 1912, a sensor component 1914, and a communication component 1916.

The processing component 1902 generally controls operations of the apparatus 1900, such as operations related to display, phone call, data communication, camera operation, and recording operation. The processing component 1902 may include one or more processors 1920 for executing instructions so as to perform all or part of the steps of the above method. Additionally, the processing component 1902 may include one or more modules to facilitate interaction between the processing component 1902 and the other components. For example, the processing component 1902 may include a multimedia module so as to facilitate interaction between the multimedia component 1908 and the processing component 1902.

The memory 1904 is configured to store various instructions and/or data so as to support operations on the apparatus 1900. Instances of these instructions and/or data include instructions of any application program or method to be performed by the apparatus 1900, contact person data, telephone directory data, messages, pictures, videos, and the like. The memory 1904 may be realized by any type of volatile or non-volatile storage device or their combination, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or a compact disc.

The power component 1906 provides power for the various components of the apparatus 1900. The power component 1906 may include a power management system, one or more power sources, and other components related to power generation, management, and distribution for the apparatus 1900.

The multimedia component 1908 includes a screen which provides an output interface between the apparatus 1900 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping, and gestures on the touch panel. The touch sensor can not only sense a boundary of a touching or swiping action, but also detect duration and pressure related to a touching or swiping operation. In some examples, the multimedia component 1908 includes a front camera and/or a rear camera. When the apparatus 1900 is in an operation mode, such as a photographing mode or a video mode, the front camera and/or the rear camera can receive external multimedia data. Each front camera and each rear camera may be a fixed optical lens system or have a focal length and an optical zoom capability.

The audio component 1910 is configured to output and/or input an audio signal. For example, the audio component 1910 includes a microphone (MIC). When the apparatus 1900 is in an operation mode, such as a call mode, a recording mode and a voice recognition mode, the microphone is configured to receive an external audio signal. The received audio signal may be further stored in the memory

1904 or sent via the communication component 1916. In some examples, the audio component 1910 further includes a speaker for outputting the audio signal.

The I/O interface 1912 provides an interface between the processing component 1902 and a peripheral interface module, and the peripheral interface module may be a keyboard, a click wheel, buttons, and the like. These buttons may include, but are not limited to: a home button, a volume button, a start button, and a lock button.

The sensor component 1914 includes one or more sensors, configured to provide state evaluation of various aspects for the apparatus 1900. For example, the sensor component 1914 may detect an on/off state of the apparatus 1900 and relative positioning of the components, for example, the components are a display and a keypad of the apparatus 1900. The sensor component 1914 may further detect position change of the apparatus 1900 or one component of the apparatus 1900, whether there is contact between the user and the apparatus 1900, and azimuth or speed up/speed down and temperature change of the apparatus 1900. The sensor component 1914 may include a proximity sensor, configured to detect the existence of a nearby object without any physical contact. The sensor component 1914 may further include an optical sensor, such as a CMOS or CCD image sensor, for use in an imaging application. In some examples, the sensor component 1914 may further include an acceleration sensor, a gyroscope sensor, a magnetic sensor, a pressure sensor, or a temperature sensor.

The communication component 1916 is configured to facilitate wired or wireless communication between the apparatus 1900 and the other devices. The apparatus 1900 may access a communication standard-based wireless network, such as WiFi, 2G or 3G, 4G LTE, 5G NR, or their combination. In an example, the communication component 1916 receives a broadcast signal or related broadcast information from an external broadcast management system via a broadcast channel. In an example, the communication component 1916 further includes a near-field communication (NFC) module so as to facilitate short-range communication. For example, the NFC module may be realized based on a radio frequency identification (RFID) technology, an infra-red data association (IrDA) technology, an ultra-wideband (UWB) technology, a Bluetooth (BT) technology, and other technologies.

In an example, the apparatus 1900 may be realized by one or more of application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method for sending MDT information according to any of the above examples.

In an example, a non-transitory computer-readable storage medium including computer-readable instructions is further provided, such as a memory 1904 including the instructions. The instructions may be executed by the processor 1920 of the apparatus 1900 so as to carry out the above method. For example, the non-transitory computer-readable storage medium may be a ROM, a random access memory (RAM), a CD-ROM, a magnetic tape, a floppy disk, an optical data storage device, and the like.

According to the examples of the present disclosure, when the first SIM card detects that one or more of the SIM card other than the first SIM card in the terminal and/or the memory of the terminal stores the first MDT information, no matter whether the first SIM card has stored any MDT information, the terminal can send, to the base station, the first MDT information stored in the one or more SIM cards other than the first SIM card and/or the memory of the terminal, and thus the base station can obtain the MDT information in the terminal in time to use the MDT information.

The present disclosure may include dedicated hardware implementations such as application-specific integrated circuits, programmable logic arrays, and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly; the system disclosed may encompass software, firmware, and hardware implementations. The terms "module," "sub-module," "circuit," "sub-circuit," "circuitry;" "sub-circuitry," "unit," or "sub-unit" may include memory (shared, dedicated, or group) that stores code or instructions that can be executed by one or more processors. The module referred to herein may include one or more circuit with or without stored code or instructions. The module or circuit may include one or more components that are connected.

Those skilled in the art, upon reading this disclosure, will easily arrive at other implementations and solutions of the present disclosure after considering the teachings provided in the specification and appreciating the scope of the present disclosure. The present disclosure intends to cover any transformation, application, or adaptive change of the present disclosure which conforms to a general principle of the present disclosure and includes common general knowledge or conventional technical means in the relevant technical fields, which are not expressly disclosed herein. The specification and the examples are to be regarded as examples only: The true scope and spirit of the present disclosure are indicated by the following claims.

It should be understood that the present disclosure is not limited to the specific structures described above and shown in the drawings and encompasses various modifications and changes without departing from the scope of the disclosure.

Terms such as "first" and "second" are used herein only for distinguishing an entity or an operation from another entity or operation, and do not necessarily require or imply these entities or operations have any particular actual relationships or sequences. Terms "include", "contain" or any of their variants are intend to be construed as open ended so that a process, a method, a product or a device described as 'including' or 'containing' one or more elements can include or contain not only those elements, but other or additional elements not explicitly listed, and may encompass inherent elements of the process, the method, the product or the device. Without limitation, as for an element to which is appended a statement such as "include a/an . . . " the statement does not exclude other elements from the process, the method, the product or the device including the element.

The method and the apparatus provided by the examples of the present disclosure are described in detail above. The principle and implementations of the present disclosure are set forth in the specific examples and instances described in detail herein. Those ordinarily skilled in the art may derive changes that depart from the specific implementations; however, these do not fall outside the scope of the application, which is defined according to the examples of the present disclosure.

What is claimed is:

1. A method for sending minimization of drive test (MDT) information, performed by a terminal, wherein a plurality of subscriber identity module (SIM) cards are arranged in the terminal, the method comprises:

determining first MDT information stored in a SIM card other than a first SIM card among the plurality of SIM cards, before the first SIM card establishes a radio resource control (RRC) connection with a base station; and sending, by the terminal, the first MDT information to the base station;

wherein sending, by the terminal, the first MDT information to the base station comprises:

sending, by the first SIM card, the first MDT information to the base station after the first SIM card establishes the RRC connection with the base station;

wherein the method further comprises:

determining by the first SIM card, whether the first MDT information is the same as second MDT information, in a case where the first SIM card stores the second MDT information;

wherein sending, by the first SIM card, the first MDT information to the base station comprises:

sending, by the first SIM card, the second MDT information to the base station, in response to determining that the first MDT information is the same as the second MDT information; and sending, by the first SIM card, the first MDT information and the second MDT information to the base station, in response to determining that the first MDT information is different from the second MDT information.

2. The method according to claim 1, wherein the method further comprises:

sending, to the base station, first indication information by the first SIM card, wherein the first indication information informs the base station that the SIM card other than the first SIM card stores the first MDT information.

3. The method according to claim 1, wherein the method further comprises:

sending, to the base station, second indication information by the first SIM card, wherein the second indication information indicates at least one of:

a storage position of the first MDT information; or a type of the first MDT information.

4. The method according to claim 1, wherein the method further comprises:

receiving, by the first SIM card, third indication information issued by the base station, wherein the third indication information instructs the first SIM card to send the first MDT information to the base station.

5. The method according to claim 1, wherein sending the first MDT information to the base station comprises:

receiving, by the SIM card other than the first SIM card, a paging signaling sent by the base station to the SIM card other than the first SIM card; and sending, by the SIM card other than the first SIM card, the first MDT information to the base station after the SIM card other than the first SIM card establishes the RRC connection with the base station based on the paging signaling.

6. A non-transitory computer readable storage medium, storing a computer program thereon, wherein the computer program, when collectively executed by one or more processors of a terminal, causes the terminal to perform the method for sending MDT information according to claim 1.

7. A method for receiving minimization of drive test (MDT) information, performed by a base station and comprising:

receiving first indication information sent by a terminal, wherein the first indication information informs the base station that a subscriber identity module (SIM) card other than a first SIM card among a plurality of SIM cards of the terminal stores first MDT information;

determining whether to receive the first MDT information according to the first indication information;

sending a paging signaling to the SIM card other than the first SIM card or sending third indication information to the terminal, in response to determining to receive the first MDT information, wherein the third indication information instructs the first SIM card to send the first MDT information to the base station; and receiving the first MDT information;

wherein receiving the first MDT information comprises:

receiving the first MDT information sent by the first SIM card after the first SIM card establishes a radio resource control (RRC) connection with the base station;

wherein the method further comprises:

receiving second MDT information, stored in the first SIM card, sent by the first SIM card, in a case where the first SIM card determines that the first MDT information is the same as the second MDT information; and receiving the first MDT information and the second MDT information sent by the first SIM card, in a case where the first SIM card determines that the first MDT information is different from the second MDT information.

8. The method according to claim 7, wherein the method further comprises:

receiving second indication information sent by the terminal, wherein the second indication information indicates at least one of a storage position of the first MDT information or a type of the first MDT information; and wherein determining whether to receive the first MDT information according to the first indication information comprises:

determining whether to receive the first MDT information according to the first indication information and the second indication information.

9. The method according to claim 7, wherein in a case of determining to receive the first MDT information and sending the paging signaling to the SIM card other than the first SIM card, receiving the first MDT information comprises receiving MDT information sent by the SIM card other than the first SIM card; or in a case of determining to receive the first MDT information and sending the third indication information to the terminal, receiving the first MDT information comprises receiving MDT information sent by the first SIM card.

10. An electronic device, comprising:

one or more processors; and a memory, configured to store processor-executable instructions;

wherein the one or more processors, when executing the processor-executable instructions, collectively cause the electronic device to act as a base station and to perform the method for receiving minimization of drive test (MDT) information according to claim 7.

11. A non-transitory computer readable storage medium, storing a computer program thereon, wherein the computer program, when collectively executed by one or more processors of a base station, causes the base station to perform the method for receiving MDT information according to claim 7.

12. An electronic device, comprising:

one or more processors; and a memory, configured to store a processor-executable instruction;

wherein the one or more processors, when executing the processor-executable instruction, collectively cause the electronic device to act as a terminal and to:

determine first minimization of drive test (MDT) information stored in a subscriber identity module (SIM) card other than a first SIM card among a plurality of SIM cards of the terminal, before the first SIM card establishes a radio resource control (RRC) connection with a base station; and send the first MDT information to the base station;

wherein sending the first MDT information to the base station comprises:

sending, by the first SIM card, the first MDT information to the base station after the first SIM card establishes the RRC connection with the base station;

wherein the one or more processors are further collectively configured to:

determine, by the first SIM card, whether the first MDT information is the same as second MDT information in a case where the first SIM card stores the second MDT information;

wherein the one or more processors are further collectively configured to:

send, by the first SIM card, the second MDT information to the base station in response to determining that the first MDT information is the same as the second MDT information; and send, by the first SIM card, the first MDT information and the second MDT information to the base station in response to determining that the first MDT information is different from the second MDT information.

13. The electronic device according to claim 12, wherein the one or more processors are further collectively configured to:

send, to the base station, first indication information by the first SIM card, wherein the first indication information informs the base station that the SIM card other than the first SIM card stores the first MDT information.

14. The electronic device according to claim 12, wherein the one or more processors are further collectively configured to:

send, to the base station, second indication information by the first SIM card, wherein the second indication information indicates at least one of:

a storage position of the first MDT information; or a type of the first MDT information.

15. The electronic device according to claim 12, wherein the one or more processors are further collectively configured to:

receive, by the first SIM card, third indication information issued by the base station, wherein the third indication information instructs the first SIM card to send the first MDT information to the base station.

16. The electronic device according to claim 12, wherein the one or more processors are further collectively configured to:

receive, by the SIM card other than the first SIM card, a paging signaling sent by the base station to the SIM card other than the first SIM card; and send, by the SIM card other than the first SIM card, the first MDT information to the base station after the SIM card other than the first SIM card establishes the RRC connection with the base station based on the paging signaling.

* * * * *